United States Patent [19]

Kami et al.

[11] Patent Number: 5,114,180
[45] Date of Patent: May 19, 1992

[54] AIR BAG

[75] Inventors: Yoshinori Kami, Saitama; Kunihiko Fukumori, Takatsuki, both of Japan

[73] Assignee: Asahi Kasei Kogyo Kabushiki Kaisha, Osaka, Japan

[21] Appl. No.: 465,265

[22] PCT Filed: Aug. 1, 1989

[86] PCT No.: PCT/JP89/00791
§ 371 Date: Apr. 2, 1990
§ 102(e) Date: Apr. 2, 1990

[87] PCT Pub. No.: WO90/01436
PCT Pub. Date: Feb. 22, 1990

[30] Foreign Application Priority Data

Aug. 3, 1988 [JP] Japan .................. 63-192829
Aug. 6, 1988 [JP] Japan .................. 63-195311
Jun. 14, 1989 [JP] Japan .................. 1-149339

[51] Int. Cl.$^5$ ............................................. B60R 21/20
[52] U.S. Cl. ...................................... 280/743; 280/739
[58] Field of Search .................. 280/739, 743, 728

[56] References Cited

U.S. PATENT DOCUMENTS

| 3,807,754 | 4/1974 | Rodenbach et al. | 280/743 |
| 3,888,504 | 6/1975 | Bonn et al. | 280/743 |
| 4,921,735 | 5/1990 | Bloch | 280/743 |

FOREIGN PATENT DOCUMENTS

| 8905250 | 6/1989 | World Int. Prop. O. | 280/728 |
| 48-20195 | 6/1973 | Japan . | |
| 52-11095 | 3/1977 | Japan . | |
| 58-22360 | 2/1983 | Japan . | |

Primary Examiner—Kenneth R. Rice
Attorney, Agent, or Firm—Finnegan, Henderson, Farabow, Garrett & Dunner

[57] ABSTRACT

An air bag having improved characteristics of preventing rebounding, a light weight and a lower price, wherein a bag-like body having an opening for attaching a gas generator is manufactured by joining circumferential portions of at least two woven fabrics, a coating film is partially provided on a surface of the bag-like body to reinforce the bag-like body and prevent injury to a passenger, and an exhausting portion is provided by suitably determining an area where the coating film is not provided according to an air permeability of the woven fabric. A further improvement of the performance and a cost reduction of the air bag can be obtained by forming the joining portion with a binding-to-one layer weave.

23 Claims, 10 Drawing Sheets

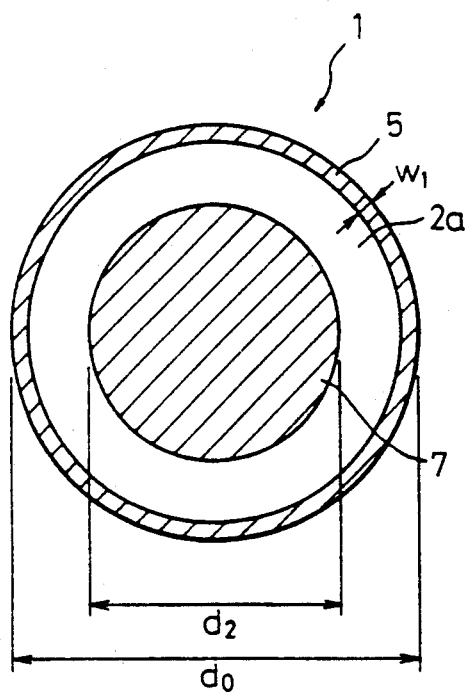
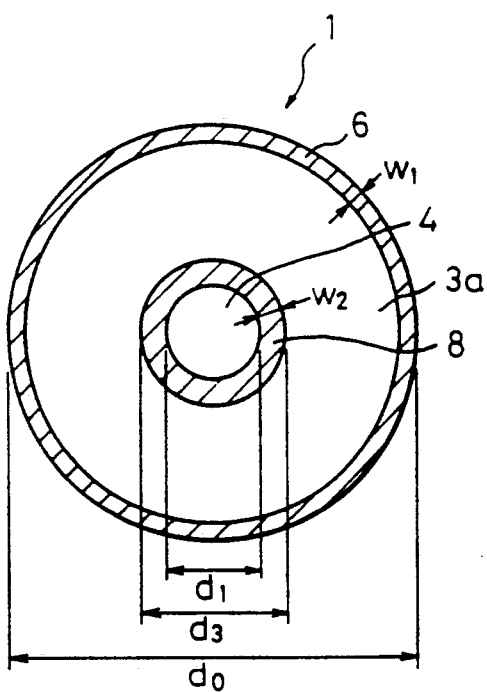
Fig. 1A  Fig. 1B
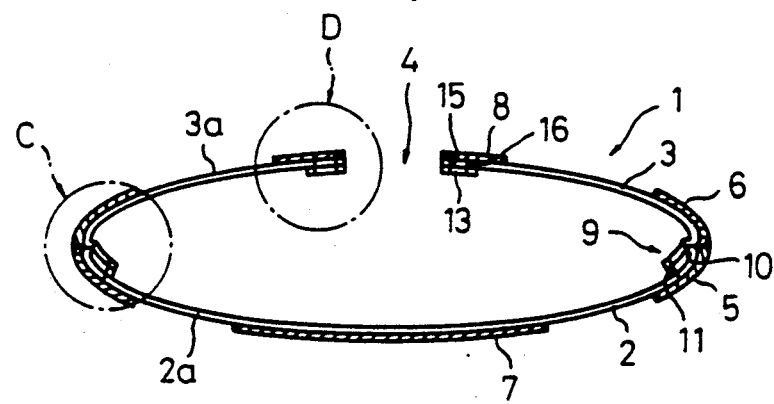
Fig. 2

AIR BAG

TECHNICAL FIELD

The present invention relates to an impact absorbing bag used for the protection of passengers in a car.

PRIOR ART

The use of an air bag apparatus is recommended, to prevent body injury to passengers during a collision between a car and another object. The air bag apparatus is comprised of a sensor for detecting a collision between the car and another object, and a gas generator which inflates the air bag on receipt of a signal from the sensor, whereby the air bag is expanded by gas from the gas generator and the force of impact on passenger when the car collides with another object is absorbed by the bag.

An example of a known conventional air bag used for a driver's seat is now explained. As shown in a plain view of FIG. 18 and a cross sectional view of FIG. 19, this air bag is obtained by providing a coating film 55 of a synthetic rubber or the like on the surfaces of two woven fabrics 52 and 53 composed of a synthetic filament such as Nylon 66 or the like, picking pieces of the woven fabrics having a predetermined shape from the obtained coated woven fabric, and joining each circumferential portion 57 by sewing by sewing threads 58 and 59. As shown in FIG. 18(B), an opening 54 in which the gas generator is fixed on a center position of the woven fabric 53, which is arranged at a side opposite to the steering wheel, and one or two gas exhausting holes 56a and 56b are provided on the woven fabric 53, before the sewing operation is applied. As shown in FIG. 18(A), a surface of the woven fabric 52, which is arranged at a side opposite to the driver, is wholly covered with the coating film. In the example shown in FIG. 18 and FIG. 19, a reinforcing fabric 62 is fixed on a circumferential portion of the gas generator opening 54 by the sewing threads 60 and 61. An air bag for a navigator seat or a rear seat has the same essential structure as that of the air bag 51 for the driver's seat, except that they have a different shape.

In the above-mentioned known air bag 51, the woven fabrics 52 and 53 are applied with the coating layers to prevent a leakage of the inflating gas from the woven fabrics 52 and 53 when the car collides with another object, and the resulting insufficient protection of the passenger. After the air bag is inflated, the air bag is required to hold the passenger on the seat, to prevent a rebounding of the passenger, and thus the air bag is made such that a predetermined volume of a gas in the air bag can be exhausted therefrom when a body of the passenger is forced out of the seat and into the air bag. In the above-mentioned air bag 51, two exhaust holes 56a and 56b are provided to obtain the above object.

The conventional known air bag having the above-described structure has a superior passenger protection function per se, but has several problems relating the accommodation of the air bag in a car, and in the manufacturing thereof.

Namely, a coating film is arranged on a whole surface of the woven fabric in the conventional known air bag, and accordingly, the obtained air bag becomes very heavy and stiff, and as a result, it is impossible to accommodate the air bag in a compact space. Further, it is necessary to make the gas generator relatively large in size for an air bag having a heavy weight, and accordingly a problem that the air bag apparatus itself becomes large in size is raised. Further since the exhausting holes are provided by a posttreatment, extra labor becomes necessary.

A proposal by which air in the inflated air bag is exhausted from the woven fabric without the use of the exhausting holes, has been made to solve the above-mentioned problems.

Namely, Japanese Examined Utility Model Publication (Kokoku) No. 48-20195 discloses an air bag manufactured by printing a dot type pattern with a resin on a knitted fabric or a woven-fabric having an air permeability, and sewing the obtained knitted fabrics or the woven fabrics together to obtain an air bag in which the air exhausting volume is controlled. In this air bag, a portion of the fabric at which the resin printing is not applied has an air permeability, and according by, this air bag has an advantage in that the exhausting hole is not necessary, and thus the weight of the air bag is reduced.

Further, Japanese Examined Patent Publication (Kokoku) No. 52-11095 discloses an air bag composed of a fabric manufactured by providing a covering layer of an expanded resin on a knitted fabric having stretch properties, to make a coated fabric having an air ventilating volume of 200 cc/cm$^2$/sec measured under a pressure of 1 kg/cm$^2$. The gas can be leaked from the whole fabric constituting the air bag in this air bag, and accordingly, it is unnecessary to provide the exhausting hole.

Further, Japanese Unexamined Utility Model Publication (Kokoku) No. 58-22360 discloses an air bag composed of a bag-like body 61a manufactured by joining an airtight portion 62 molded into a cup-like shape with an air permeable portion 63 molded into a cup-like shape, by sewing as shown FIG. 20(A). As shown in FIG. 20(B), which is a more concrete illustration of this air bag, in the air tight portion 62 used for the passenger seat side, a surface of the fabric 62a is provided with a coating film 62b of a rubber, a synthetic resin or the like, and in the air permeable portion 63 used for the car body side, the fabric itself is used. Each circumferential edge 64 of the airtight portion 62 and the air permeable portion 63 is joined by sewing. The gas can be leaked from the air permeable portion 63 in this air bag, and accordingly, it is unnecessary to provide the exhausting hole.

- All of the air bags disclosed in the three above publications have an advantage that it is unnecessary to provide the exhausting hole, but each air bag has various problems based on a structure thereof.

Namely, the coating film applied on the knitted fabric or the woven fabric used in the air bag disclosed in Japanese Examined Utility Model Publication (Kokoku) 48-20195 has, for example, the dot-like pattern, when the air bag is inflated, the gas in the air bag leaks from the whole surface including a surface in contact with the passenger, and accordingly, this air bag is defective in that the passenger cannot be surely held on the seat. Further more, holes between the yarns of the fabric are generated in the sewing portion applied to unprinted portion of the fabric, by an abrupt inflation of the air bag, and as a result, a problem arises in that the gas will flow out from the holes and the fabric might tear at those points.

The air bag disclosed in Japanese Examined Patent Publication (Kokoku) No. 52-11095 has the same structure as that of the air bag of Japanese Examined Utility Model Publication (Kokoku) No. 48-20195, i.e., a structure in which the gas in the air bag leaks from the whole surface including a surface in contact with the passenger, and accordingly this air bag has the same defect in that the passenger cannot be surely held on the seat.

In the air bag disclosed in Japanese Examined Utility Model Publication (Kokoku) No. 58-22360, the leakage of gas is completely prevented in the airtight portion used on the side of the passenger, and the gas leaks in the air permeable portion used on the side of the car. The area of the airtight portion is substantially identical to the area of the air permeable portion, in the structure of this air bag, and accordingly, even if the woven weave of the fabric constituting the air permeable portion is changed, it is impossible to suitably control the rebounding of the passenger.

The manner of an inflation of the air bag when in use will now be explained with reference to FIG. 12, showing an air bag development testing apparatus, and FIG. 14 showing a graph of the differences between an inflating time and an internal pressure in the air bag. (This will be described in more detail when an air bag in accordance with the present application is described later.) When the air bag is inflated in the air bag development testing device of FIG. 12, the air bag behaves as shown in the graph of FIG. 14, in which the pressure of the gas in the air bag is denoted on the ordinate axis and a time is denoted on the abscissa axis. Namely, when the inflater is activated, the air bag is inflated and the cover of the air bag accommodating case is broken, and a high pressure gas (referred to as $P_1$ hereafter, although the symbol $P_1$ is not shown in FIG. 14) is generated, which high pressure is lowered as the air bag is inflated. When the air bag is filled with gas, the pressure of the gas is raised to a second maximum pressure $P_2$, at the time $t_2$, and thereafter, the pressure of the gas is gradually lowered and becomes substantially zero at the time $t_3$. When the value $t_3$ is too small, the passenger is not property held in the seat, and when the value $t_3$ is too big, a rebounding of the passenger occurs. Accordingly, to obtain an air bag having a high safety factor, the value $t_3$ must be suitably determined. Accordingly, an exhausted quantity of the air bag must be suitably determined, and it is impossible to control the exhausting quantity in such a manner that the value $t_3$ is a value suitable for an air bag having a structure in which a fabric opposite the passenger is merely made airtight and a fabric opposite to the car body is merely made air permeable.

Further, the air permeable portion in this air bag is constituted by the woven fabric, and the air bag is fixed to the car body by the air permeable portion. Accordingly, when the air bag is abruptly inflated and expanded, and is pushed toward a position away from the car body, there is a risk that the fixing of the air bag to the car body may be destroyed.

Further, since the airtight portion and the air permeable portion of this air bag, are joined by sewing, holes between yarns of the fabric are generated at the sewn portions of the air permeable portion, by an abrupt inflation of the air bag, and as a result, the problems that the gas with flow out of the holes, and that the air permeable portion of the air bag will break, occur.

The above-mentioned description is of problems encountered by the conventional known air bags obtained by sewing a plurality of woven fabrics (two woven fabrics are usually used for an air bag at the driver's seat) and having a coating film.

As described above, the conventional air bag can be obtained by joining a plurality of the woven fabrics by sewing, but the sewing generates problems such as a lowered strength of the woven fabric due to damage to the woven fabric caused by the sewing needle, and a lowered strength of a sewn portion due to yarn slippage or an unsuitable positioning of the sewn line when the woven density of the fabric is low. Accordingly, the sewing operation should be performed in such a manner that the above-mentioned problems do not arise. In this case, however, the sewing process becomes expensive, resulting in a higher cost of the nonwoven fabric. To eliminate the problems caused by the sewing process, various joining methods such as using an adhesive, or a joining method in which a sheet of unvulcanized rubber is arranged in a sandwich form between circumferential portions of the fabrics and the two fabrics are then subjected to a vulcanizing treatment, have been proposed. The joining method using an adhesive has a problem in operation in that after applying the adhesive, the fabrics must be heated under pressure for a long time. The joining method using the vulcanizing treatment also has a problem in that a heating process is required and the joined portion becomes very hard. Further there is a risk that the joined portions of the plurality of woven fabrics are likely to burst open when the air bag is inflated, in both of the above-mentioned joining methods. Accordingly, although it appears that, if a joining process such as the sewing or the like is used for the reinforcement of a portion near an opening arranged for a gas generator, when an air bag is manufacture that a bag-like shape of a main body of the air bag is formed without the joining treatment, and a coating film is suitably applied on the air bag, the performance of the air bag and the manufacturing costs thereof would become extremely advantageous, the above-mentioned air bag has not yet appeared.

DISCLOSURE OF THE INVENTION

A primary object of the present invention is to eliminate the problems of the prior art and to provide an air bag having a light weight, a soft handling, a superior folding property, a good holding of a passenger on a seat when the air bag is inflated, and a superior prevention of a rebounding of the passenger, and able to be manufactured at a low cost.

- A second object of present invention is to provide an air bag capable of attaining the above-mentioned primary object and further eliminating the problems caused by the presence of portions joined by, for example, sewing or the like by reducing the number of joined portions as much as possible.

The primary object of the present invention can be attained by an air bag comprised of a bag-like body manufactured by joining circumferential portions of at least two woven fabrics having a weight per unit area of between 100 g/m$^2$ and 300 g/m$^2$ and a coating film partially arranged on a surface of the bag-like body, an opening for attaching a gas generator being provided in the bag-like body, the coating film being arranged at least on an outer peripheral area of the opening of the gas generator and on an area in contact with the passenger when the air bag is activated, and on a surface of the bag-like body opposite to the passenger, this area of the bag-like body is not coated with a film and acts as a gas exhausting area after the air bag is inflated. An area of the gas exhausting area is determined according to an air permeability of the woven fabric, such that the gas is exhausted under a predetermined relationship between a pressure and a time.

It is preferable to arrange the coating film on the circumferentially joined portion and a portion near thereto, to prevent destruction of the circumferential portion when the air bag is inflated.

When a pressure of the gas generated from an inflator is held at a lower pressure, however, the coating film on the circumferential portion and the portion near thereto may be omitted, by strengthening the circumferential portion by using a woven fabric having a high woven density.

The time $t_3$, during which an internal pressure shown by an internal pressure curve obtained by a development test becomes substantially zero, must be a suitable value by which a superior rebounding prevention effect is obtained from the air bag when in use. As described have before, when the time $t_3$ is too long, rebounding occurs, and when the time $t_3$ is too short, the passenger is not properly held on the seat. Accordingly, it is preferable to determine an area of the exhausting surface according to an air permeability of the woven fabric used such that the time $t_3$ in which the internal pressure on an internal pressure curve obtained by the development test becomes substantially zero is between 70 ms and 170 ms. Also, preferably a value of the internal pressure $P_2$ is between 0.03 kgf/cm$^2$ and 0.3 kgf/cm$^2$.

A pressure in the air bag when the air bag is activated and the passenger is in contact with the air bag is usually about 0.5 kgf/cm$^2$, and therefore, preferably the air permeability of the woven fabric used is defined by a value measured under a pressure of 0.5 kgf/cm$^2$. When a woven fabric having an air permeability of between 100 cc/cm$^2$/sec and 600 cc/cm$^2$/sec, measured by a frazile tester under a pressure of 0.5 kgf/cm$^2$ is used, an air bag having a superior rebounding prevention can be manufactured by suitably determining an area of an exhausting surface in an air bag mode of the above woven fabric.

A cover factor (K) of the woven fabric as defined by the following equation, is preferably between 1400 and 2400, to satisfy the condition for air permeability $K_T$ = Warp Density (ends/inch) × $\sqrt{\text{Thickness of Warp Yarn (denier)}}$ $K_W$ = Weft Density (picks/inch) × $\sqrt{\text{Thickness of Weft Yarn (denier)}}$ $K = K_T + K_W$ The coating film may be arranged on either an inside or an outside of the bag-like body.

A coating film arranged on an area of the woven fabric used on the passenger side and in contact with the passenger when the air bag is inflated, may be substantially continued from a coating film arranged on a circumferential joined portion, and a portion near thereto, of the air bag. The exhausting portion may be constituted such that the gas can be exhausted from both the woven fabric opposite the passenger and the woven fabric opposite the car body, by further providing the exhausting portion in the woven fabric opposite the passenger.

Nylon 66, Nylon 6, a polyester fiber, an aramid fiber, another type of polyamide fiber, and another type of polyester fiber can be used as a yarn for the woven fabric of the air bag in accordance with the present invention. Nylon 66 multifilament is preferably used due to a high strength of the above fibers. A thickness of the yarn may be between 210$^d$ and 1260$^d$, and a yarn having the thickness of 840$^d$ is usually used. When the Nylon 66 multifilament of 840$^d$ is used, preferably the woven fabric is woven under the condition that both the warp density and weft density are between 25 and 35, and preferably, at a density of 25 for the air bag at a driver's seat and a density of 35 for the air bag at a navigator's seat.

A synthetic rubber such as a chloroprene rubber, a urethane rubber, a silicone rubber, an acrylic rubber or the like, can be used.

The second object of the present invention can be attained by forming an air bag by a tubular weaving process and joining the circumferential portions of the woven fabrics by a weave wherein two or more woven fabrics are joined to a woven fabric (hereafter referred as to an interlocking one layer weave).

The air bag in accordance with the present invention includes an air bag for a driver's seat made by joining two woven fabrics having a substantially circular shape, by sewing; an air bag for a driver's seat made by joining circumferential portions of the air bag by the interlocking one layer weave; and an air bag for seats other than the driver's seat, formed in a hollow cylindrical shape.

In the air bag having a substantially circular shape, an air bag satisfying the conditions of the present invention, and having a weight calculated on the basis of an air bag having an outer diameter of 70 cm, and an opening for attaching a gas generator and having the inner diameter of 10 cm is 250 g or less becomes an extremely sufficient air bag when in use.

BRIEF DESCRIPTION OF THE DRAWINGS

FIG. 1 is a plan view of a preferably example of an air bag for the driver's seat, obtained by joining two woven fabrics by sewing, wherein FIG. 1(A) is a plan view of a surface opposite the driver's seat and FIG. 1(B) is a plain view of a surface opposite the steering wheel;

FIG. 2 is a cross sectional view of the air bag illustrated in FIG. 1;

FIGS. 5 to 7 are plan views illustrating different embodiments of arrangements of coating films on a surface opposite a driver's seat, of an air bag for the driver's seat in accordance with the present invention, wherein FIG. 5 shows a case in which the coating film is arranged from a center with a large area, FIG. 6 shows a case in which the coating is arranged over a whole surface opposite the driver's seat, and FIG. 7 shows a case in which exhausting portions are partially arranged on a surface opposite the driver's seat;

FIG. 8 is a plan view illustrating another preferable example of an air bag for the driver's seat in accordance with the present invention, and having a circumferentially joined portion joined by an interlocking one layer weave, wherein

FIG. 18 is a plan view illustrating an example of a conventional air bag for a driver's seat, and having a coating film over the whole surface thereof, wherein

BEST MODE OF CARRYING OUT THE INVENTION

Figure 3A:
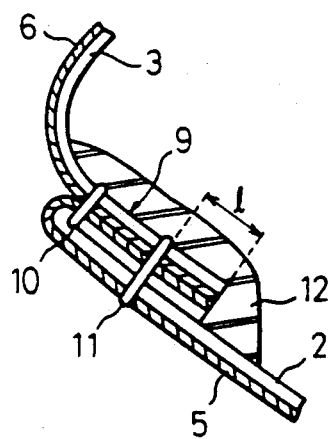
FIG. 3(A) is a cross sectional view illustrating a method of sewing a circumferential portion of the air bag.

An air bag in accordance with the present invention will now be described on the basis of an air bag for a driver's seat obtained by joining two woven fabrics by sewing, with reference to FIGS. 1 to 7.

FIG. 1 shows a plan view illustrating an example of an air bag for a driver's seat in accordance with the present invention, and FIG. 2 shows a cross sectional view illustrating the air bag when inflated. In the drawings the diameters of each portion are denoted as $d_0$, $d_1$, $d_2$, and $d_3$, and the widths of each portion are denoted as $W_1$, and $W_2$. FIG. 1(A) shows a front side, i.e., a driver's side when the air bag is mounted inside the car, and FIG. 1(B) shows a back side, i.e., a steering wheel side when the air bag is mounted inside the car. As shown in FIGS. 1 and 2, the air bag 1 is formed by sewing each circumferential portion of a front woven fabric 2 and a back woven fabric 3 by sewing threads 10. The circumferential portions of the two woven fabrics 2 and 3 are turned back, as shown by numeral 9 in FIG. 2, and are further fixed by a sewing thread 11. A circular hole 4 is provided on a center portion of the back woven fabric 3 as a gas generator fixing opening, and a reinforcing cloth 13 is arranged on an outer peripheral area 8 of the hole 4 from the back side of the woven fabric 3, and sewn by sewing threads 15 and 16. A plurality of holes (not shown) through which fixing bolts are inserted are provided on the portion reinforced by the reinforcing cloth 13.

Circumferential portions 5 and 6 of the air bag, and the outer peripheral area 8 of the circular hole 4 are coated with a chloroprene rubber, to reinforce those portions, whereby holes between yarns constituting the woven fabric, which are likely to be generated at this portion when the air bag is inflated, are prevented. The coating of the circumferential portions 5 and 6 may be omitted by improving a constitution of the woven fabric according to the service required of the air bag.

Figure 5:
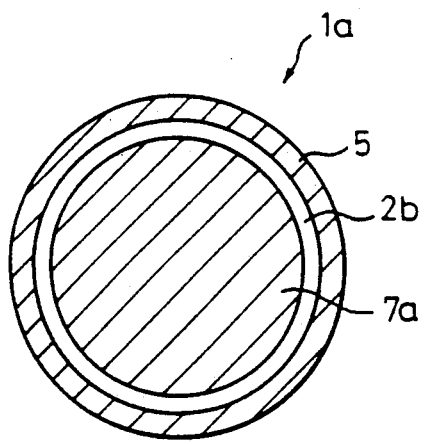
Figure 6:
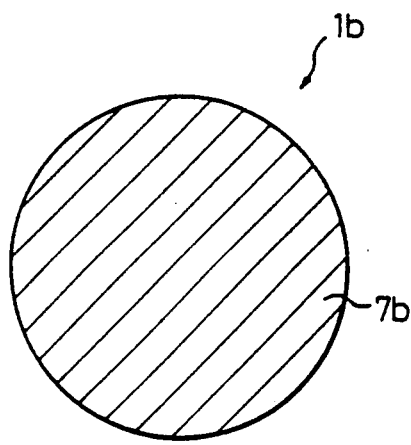
Figure 7:
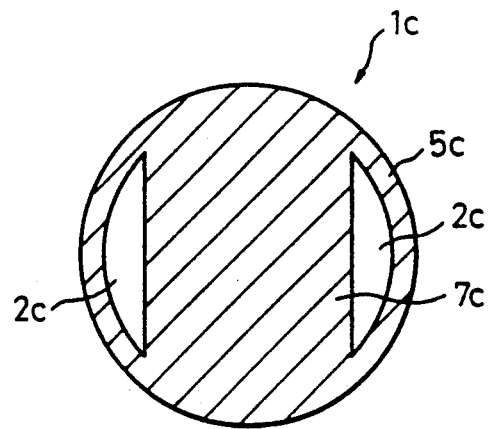

In the embodiment shown in FIGS. 1 and 2, a center portion 7 of the front woven fabric 2 is further coated with the chloroprene rubber. An area ratio of the central portion 7 and uncoated portions 2a and 3a is such that an exhausting of gas in an inflated air bag can be performed in accordance with a predetermined relationship between a pressure and a time, as described hereafter. The coated portion used for adjustment of a quantity of an exhausting gas is not limited to a front woven fabric 2, and the coated portion may be provided on the back woven fabric 3, as shown in FIGS. 1 and 2. A central coated portion 7a having a large diameter may be provided according to an air permeability of the front woven fabric 2, as shown in FIG. 5, and a coated portion 7b may be provided on the whole portion of the front woven fabric 2 as shown in FIG. 6. An uncoated portion is provided on the rear woven fabric, i.e., the woven fabric opposite the steering wheel, for exhausting the gas, in the case of FIG. 6. A shape of the coated portion is not limited to a circle as shown in FIG. 1(A) and FIG. 5, and can be any optional shape. For example, an uncoated portion 2c used as the exhausting portion can be arranged on both sides of the coated portion 7c as shown in FIG. 7. An arrangement of a coated portion on a back side of the air bag can be made by selecting an optional shape.

Even if the coating film is arranged only on the whole surface on the side of the driver and the gas is exhausted only from a back woven fabric, the object of the present invention can be attained by suitably determining an area of the coated portion and an area of the uncoated portion according to the air permeability of the woven fabric used. Nevertheless, to ensure a prevention of rebounding and a prevention of damage to the joined portions and a fixing portion in the air bag, the gas is exhausted uniformly from several portions of the air bag, and accordingly, preferably an exhausting portion is also provided on the surface opposite the driver. In this case, it is necessary to provide a coating film having a complete non-air permeability on a portion in contact with the passenger, especially, a portion in contact with an exposed part of the body, such as the face or the like, when the air bag is inflated, to ensure that a high-temperature gas is not impinged onto the passenger.

Note, the high temperature gas is exhausted in a concentrated state from one or two exhausting holes in a conventional air bag, and therefore, the high temperature gas may impinge on the drawer's hands on the steering wheel, resulting in burnt hands. The high temperature gas is exhausted from the wide exhausting portion in the air bag in accordance with the present invention, and accordingly the above danger is prevented.

The coating causes an increase of a weight of the air bag, and from this viewpoint, preferably an area ration of portions to be coated is as small as possible. To solve this problem, it is preferable to apply a callendering treatment to the woven fabric by a heat roller, before applying a coating treatment to the woven fabric to reduce the air permeability thereof.

The method of coating a predetermined portion of the woven fabric can be any conventional method used in a fabric finishing process. In this case, it is preferable to use an emulsion type of coating material rather than a solvent type of the coating material, as when the emulsion type is used, it is preferable to apply a treatment such as the callendering treatment or the like on a surface of the woven fabric, to prevent a penetration of the coating material, such as a chloroprene, into the woven fabric.

Figure 3B:
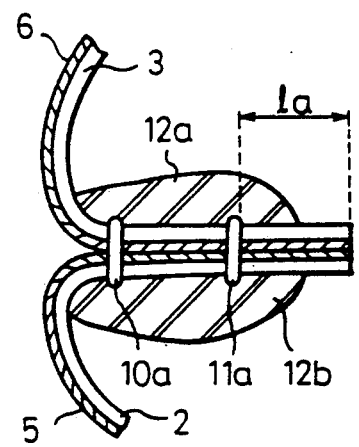
FIG. 3(B) is the same cross sectional view as that of FIG. 3(A) but another example of the sewing method.

An example of a case where coated woven fabrics 2 and 3 are sewn at each circumferential portion thereof (a portion of an air bag corresponding to a portion enclosed by a chain dot circle C) is shown in FIG. 3(A), and another example is shown in FIG. 3(B). Referring to FIG. 3(A), a woven fabric 2 coated with a coating film 5 and a woven fabric 3 coated with a coating film 6 are sewn with sewing threads 10 with seam allowances. Then the two woven fabrics 2 and 3 are turned over, as shown by a numeral 9, and the turned portion 9 is sewn to the woven fabric 2 coated with the coating film 5, with sewing threads 11. In this case, preferably a width 1 of an end of the woven fabric 2 coated with the coating film 5 is 1 cm or more. When sewing the woven fabrics 2 and 3 with the sewing threads 10 and 11, a double chain stitch machine is used, and preferably the stitch pitch is in the range of from 3 to 5 mm. The sewing threads 10 and 11 are nylon filament sewing threads, and a needle thread of 5'S or 8'S and a bobbin thread of 5'S, 10'S or 12'S are used in combination.

The sewn portion may be sealed with a sealing means 12 (FIG. 3(A)) to prevent air leakage though the sewn portion. The sealing is performed by applying a liquid rubber or an adhesive tape. When there is no possibility of an air leakage through the sewn portion, the sealing means may be omitted.

In an example shown in FIG. 3(B), a woven fabric 2 coated with a coating film 5 and a woven fabric 3 coated with a coating film 6 are sewn with sewing threads 10a and 11g, respectively, forming two spaced-apart seams. In this case, a width la of an end extending beyond the seam of the sewing thread is preferably 1 cm or more. Practically, two woven fabrics 2 and 3 having a circular shape, respectively, are sewn on two portions of the circumferential portion thereof, and then the bag is turned inside out, by using the central hole 4, to obtain a bag having the sewing state shown in FIG. 3(B). It is desirable to seal the sewing portion with sealing portions 12a and 12b. The sewing conditions for the air bag of FIG. 3(B) are the same as those explained with reference to FIG. 3(A).

Figure 4A:
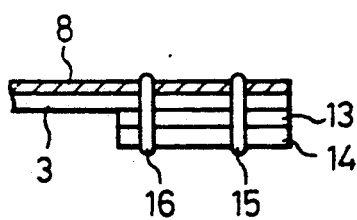
FIG. 4(A) is a cross sectional view illustrating an example of a method of sewing an outer peripheral area of a gas generator fixing opening.
Figure 4B:
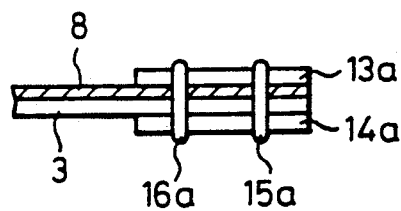
FIG. 4(B) is the same cross sectional view as that in FIG. 4(A) but illustrating another example of the sewing method.

An example of a case of sewing an outer peripheral area of a hole 4 to which the gas generator is attached (a portion corresponding to a portion enclosed by a chain dot circle D in FIG. 2) is shown in FIG. 4(A), and another example is shown in FIG. 4(B). In the case shown in FIG. 4(A), two reinforcing fabrics 13 and 14 are laid on a lower side of the woven fabric 3 coated with a coating film 8 and sewn in two spaced-apart portions by sewing threads 15 and 16. In the case shown in FIG. 4(B), two reinforcing fabrics 13a and 14a are respectively laid on opposite sides of the woven fabric coated with a coating film 8 and sewn in two spaced-apart portion by sewing threads 15a and 16a. Preferably, these sewing methods employ a lock stitch sewing machine, use 8'S nylon filament yarns as the needle threads and the bobbin threads, and form seams having a stitch pitch in the range of from 3 to 5 mm. In these cases also, the sewn portions may be sealed in the manner shown in FIG. 3.

A plurality of bolt holes, not shown, are provided in the thus-reinforced outer peripheral portion of the hole 4, and bolts are passed through the bolt holes to fasten the air bag to the car body. A gas generator may be connected to the reinforced portion of the hole 4.

Where the outer peripheral joining portion and the portion near thereto are coated, the minimum radial widths $W_1$ of the coated portion 5, 6 and 8 must be 2 cm. Normally, the radial widths $W_1$ of the coated portions 5 and 6 are 5 cm, and the width $W_2$ of the coated outer peripheral portion of the hole 4 is 10 cm.

An air bag formed by tubular weaving, in accordance with the present invention will be described with reference to FIGS. 8–11.

Figure 8A:
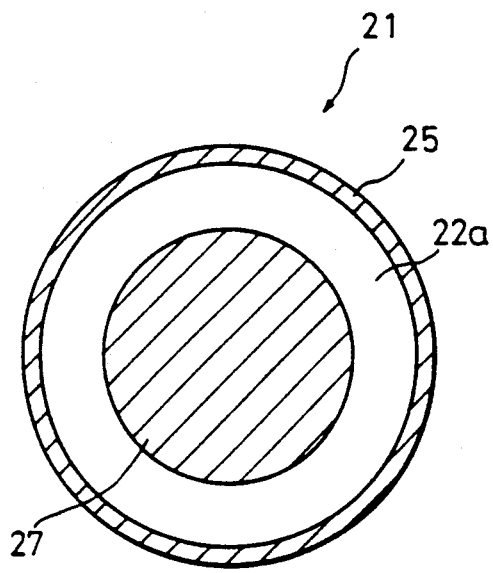
FIG. 8(A) is a plan view of a surface opposite the driver's seat and FIG. 8(B) is a plan view of a surface opposite the steering wheel.
Figure 8B:
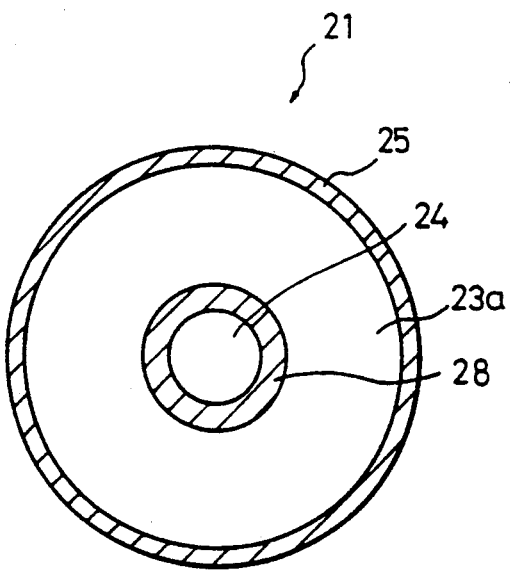
Figure 19:
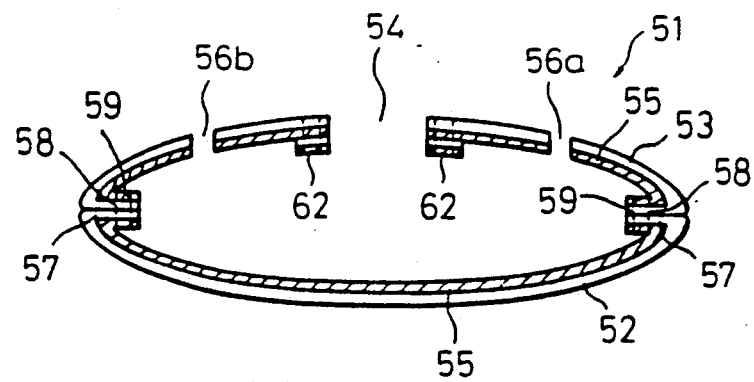
FIG. 19 is a cross sectional view of the air bag illustrated in FIG. 18.
Figure 20A:
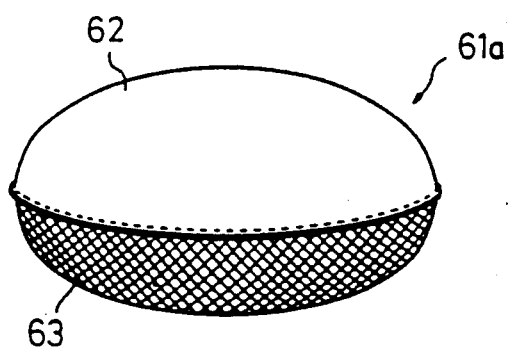
FIG. 20(A) is a perspective view illustrating an example of other conventional known air bags.
Figure 20B:
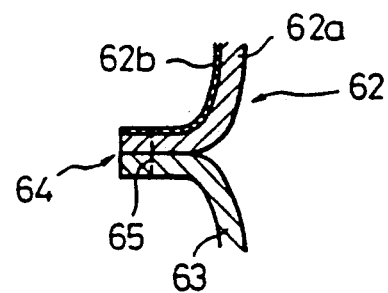
FIG. 20(B) is a cross sectional view illustrating a method of sewing the air bag illustrated in FIG. 20(A).

A preferable example of a partially coated and tubular woven fabric 21 in accordance with the present invention is shown in FIG. 8. FIG. 8(A) is a plan view of a side opposite to a passenger, i.e., a front side when the air bag is used, FIG. 8(B) is a plan view of a back side, and FIG. 19 is a cross sectional view thereof. As apparent from FIG. 9, a front side woven fabric 22 and a back side woven fabric 26 are formed by a band area of an interlocking one lay weave. This air bag is obtained by turning an air bag, just after weaving and before applying a coating treatment, inside out by using an inflator attaching hole 24, which will be described later with reference to FIGS. 10 and 11. The air bag shown in FIGS. 8 and 9 has a central coated portion 27 in the front side woven fabric 22, a coated portion 25 outside of joining portion joining the front side woven fabric 22 and the back side woven fabric 23, and a coated portion 28 in an outer peripheral portion of the inflator attaching hole 24, where the circumferential joining portion is joined by the interlocking one layer weave band area, since a strength of the circumferential joining portion is stronger than when the joining is performed by sewing, the coated portion in the circumferential joining portion and the portion near thereto often may be omitted. In the case of FIG. 8. The ratio of the total area of the coated portions 25, 27 and 28 to the area of the entire surface of the air bag is determined so that the air bag has an appropriate gas exhausting characteristic.

Figure 10:
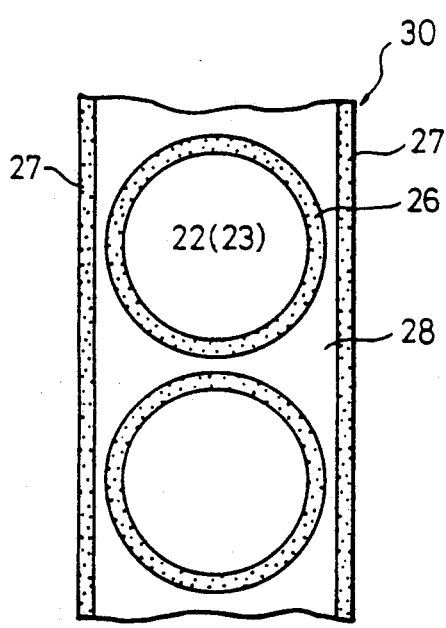
FIG. 10 is a plan view illustrating an example of the woven fabric used to obtain the air bag by the tubular weave shown in FIGS. 8 and 9.

A tubular woven air bag before the coating is applied can be obtained from a woven fabric 30 as shown in, for example, FIG. 10. Namely, this woven fabric 30 is formed by a weave in which a circumferential portion of a tubular woven portion composed of the front side woven fabric 22 and the back side woven fabric 23 is enclosed by the interlocking one layer weave having a predetermined width, and a plurality of the tubular woven air bags are continued through a tubular woven area 28 in a warp direction. In this case, if both selvages 27 are formed by the interlocking one layer weave, it facilitates the processability during a finishing or treating process.

Figure 9:
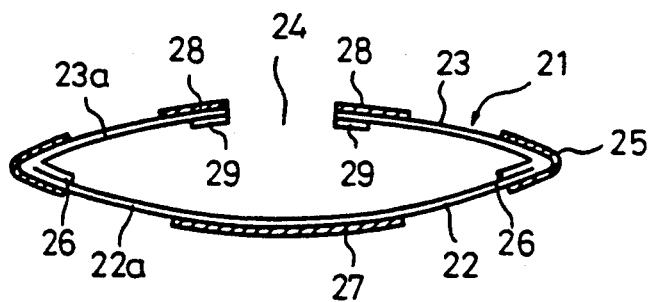
FIG. 9 is a cross sectional view of the air bag illustrated in FIG. 8.
Figure 11A:
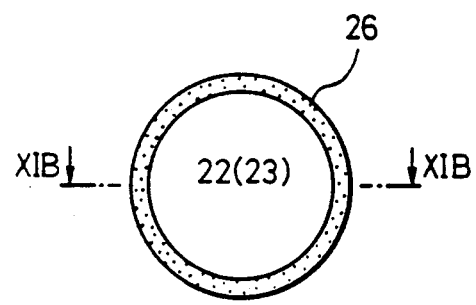
FIG. 11(A) is a plan view illustrating a tubular woven air bag obtained from the woven fabric shown in FIG. 10, before a coating treatment.
Figure 11B:
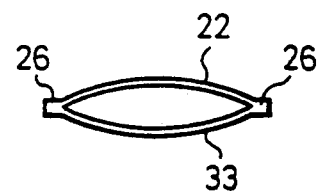
FIG. 11(B) is a cross sectional view taken along a line XIb to XIb and showing the cross section in an inflated state.

A tubular woven fabric as shown in FIG. 11 can be obtained by cutting the thus-obtained woven fabric 30 along a outer periphery of the interlocking one layer weave band area 26. An inflator attaching hole, not shown, is provided on a central portion of either side of the obtained tubular air bag, the air bag is turned inside out by the inflator attaching hole, and necessary portions of the air bag are applied with the coating, to obtain the partially coated and tubular woven air bag as shown in FIGS. 8 and 9.

The coating films are arranged on an outside of the air bags, respectively, in the air bags described with reference to FIGS. 1 to 7 and FIGS. 8 to 11, but the coating films may be arranged on an inside of the air bags.

The used woven fabric must have a strong strength such that the woven fabric will not burst when the air bag is inflated. Accordingly, it is necessary to use a woven fabric woven by a high strength filament such as Nylon 66 or the like and having a weight per unit area of b 100-300 g/m$^2$. Further, preferably the outer peripheral area of the inflator attaching hole and the joining portion of the air bag are arranged with the coating film. Further more, the air bag must be such that a gas is suitably exhausted therefrom when the air bag is inflated. The air bag must satisfy the above-mentioned conditions, and a weight of the coating film must be as light as possible, to provide an air bag having a light weight, softness, and a good accommodating property.

Accordingly, it is necessary to use a woven fabric having a sufficient strength and suitable air permeability, and to determine an area of an exhausting portion according to the air permeability of the woven fabric used.

Figure 12:
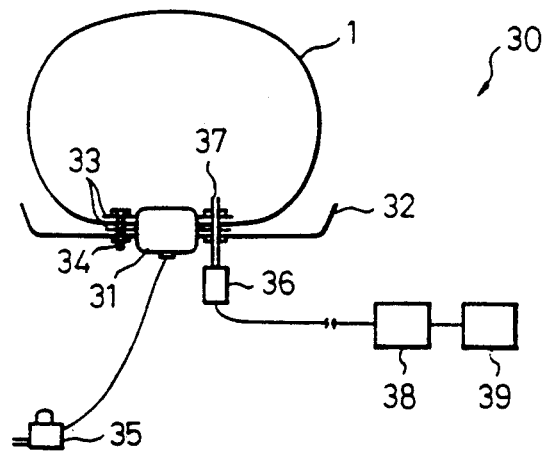
FIG. 12 is an explanatory view of an apparatus used in a development test of the air bag for the driver's seat.
Figure 14:
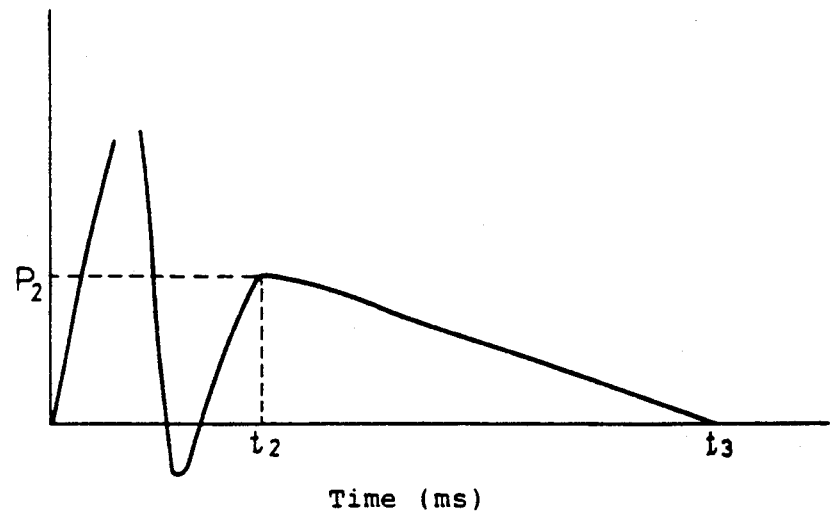
FIG. 14 is a graph illustrating an example of a time-interval pressure curve obtained by the development test of the air bag performed by the development testing apparatus shown in FIG. 12.

When a gas is exhausted after the air bag is inflated, a relationship between a pressure and a time is an important factor. FIG. 14 shows a graph illustrating a time progress against a pressure in the air bag after the air bag is inflated. An internal pressure and time curve shown in FIG. 14 is measured in a measuring apparatus at a room temperature. Namely, an air bag 1 to be measured is fixed on an inflater 31, i.e. Type GG7 supplied from Bayern, Co. in West Germany, by using a mounting metal piece 33 and three bolts 34. When the inflater 31 is ignited by a radiating electric source 35, the air bag 1 is inflated as shown in FIG. 12. An internal pressure is measured by a pressure gauge 36 having a maximum pressure of 5 kg/cm$^2$ and a measuring head 37 is inserted to the air bag 1. The pressure gauge 36 is connected through a strain gauge 38 to a recorder 39, and a curve shown in FIG. 14 is written on the recorder 39.

Figure 13A:
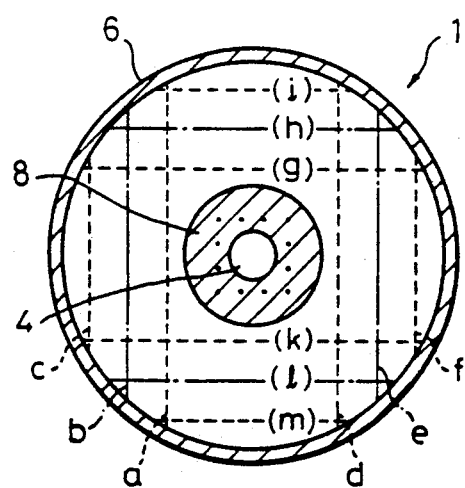
FIG. 13(A) is a plan view explaining a method of folding the air bag to accommodate the air bag in the development testing apparatus illustrated in FIG. 12.
Figure 13B:
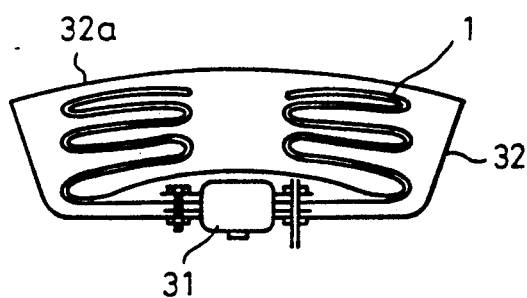
FIG. 13(B) is a cross sectional view illustrating the folded air bag when accommodated in the development testing apparatus shown in FIG. 12.

Upon attaching the inflater 31 to the air bag, the air bag 1 is folded in the same state as when the air bag 1 is actually arranged in an air bag apparatus for a car, as shown in FIG. 13(A). Namely, the air bag 1 is folded outwardly along broken lines and folded inwardly along chain-dot lines in a sequence of a, b . . . m in FIG. 13(A), is accommodated in a bag accommodating case 32 of a measuring tester 30, as shown in FIG. 13(B), and a cover 32a is arranged over the bag accommodating case 32. When the inflater 31 is activated, the air bag 1 inflates as shown in FIG. 12. When the folded air bag expands and the cover 32a is removed, an internal pressure in the air bag rises abruptly to a high pressure P$_1$ (not shown), as shown in a graph of FIG. 14. When the expansion of the air bag continues, a pressure expressed in the pressure gauge 36 falls rapidly, sometimes to a negative pressure, but the air bag is still being filled with a gas and the internal pressure in the air bag reaches to a second maximum pressure P$_2$ at the time t$_2$. Thereafter, the gas in the air bag is exhausted and the pressure becomes substantially zero at the time t$_3$.

A rebounding characteristic is determined by determining a value of t$_3$ in consideration of a relationship between t$_3$ and P$_2$. Although a preferable value of t$_3$ depends on the type of air bag, when the value of t$_3$ is between 70 ms and 170 ms, the passenger may be firmly held on a seat and there is no probability of a rebounding of the passenger. When the value of t$_3$ is smaller than the above value, it is impossible to firmly hold the passenger and absorb an impact. Further, when the value of t$_3$ is higher than the above value, the passenger suffers from rebounding.

It is necessary that a woven fabric has an adequate air permeability, to satisfy the above conditions. A preferable air permeability of the woven fabric is between 100 cc/cm$^2$/sec and 600 cc/cm$^2$/sec, as a value measured by a frazile type tester under a pressure of 0.5 kgf/cm$^2$. A cover factor of the woven fabric has the air permeability described hereinbefore and the required strength thereof is between 1400 and 2400.

The strength and the cover factor of the woven fabric depend generally on the type and thickness, i.e., denier of the yarn used and a weaving density. While the air permeability of the woven fabric is changed with the weaving weave and a finishing treatment such as a callendering treatment, a resin finishing or the like, even if the woven fabric having the same cover factor is used.

The air permeability is generally expressed from a value measured by a frazile method. An air permeability measured by the frazile method and an air permeability measured under the pressure of 0.5 kg/cm$^2$ has a positive correlation in a woven fabric manufactured by using the same yarn, the same weave, and the same finishing process, including no finishing. But in a woven fabric having a different weave, e.g., a plain weave to a twill weave, and/or a different finishing, e.g., a non-finished woven fabric to a callendering woven fabric, there is a complicated relationship between the air permeability measured by the frazile method and the air permeability measured under the pressure of 0.5 kgf/cm$^2$. This may be due to the fact that yarns constituting the woven fabric are likely to be moved by the pressure at the time that the measurement of the air permeability is performed under the pressure of 0.5 kgf/cm$^2$. Accordingly, even if the woven fabrics have the same value of the air permeability by the frazile method, a woven fabric manufactured by using a weave or finishing process in which the yarns are likely to be easily moved or has a higher value of air permeability measured under the pressure of 0.5 kgf/cm$^2$ than those of a conventional woven fabric manufactured by using a standard weave and finishing, then even if the woven fabric having a specific cover factor is used, it is possible to change the value of the air permeability measured under the pressure of 0.5 kgf/cm$^2$ by changing the weave or the finishing, and thus an area of an exhausting portion can be adjusted. For example, when the value of the air permeability measured under the pressure of 0.5 kgf/cm$^2$ can be lowered, it is possible to change the area of the exhausting portion, resulting in a small area of the coating film, and thus a weight of the air bag can be lowered and an accommodating property of the air bag can be improved.

The value between 100 cc/cm$^2$/sec and 600 cc/cm$^2$/sec of the air permeability measured under the pressure of 0.5 kgf/cm$^2$ corresponds generally to the value of between 2 cc/cm$^2$/sec and 20 cc/cm$^2$/sec of the air permeability measured by the frazile method.

An air bag in accordance with the present invention is applied to an air bag for a navigator's seat and an air bag for a rear seat.

Figure 17:
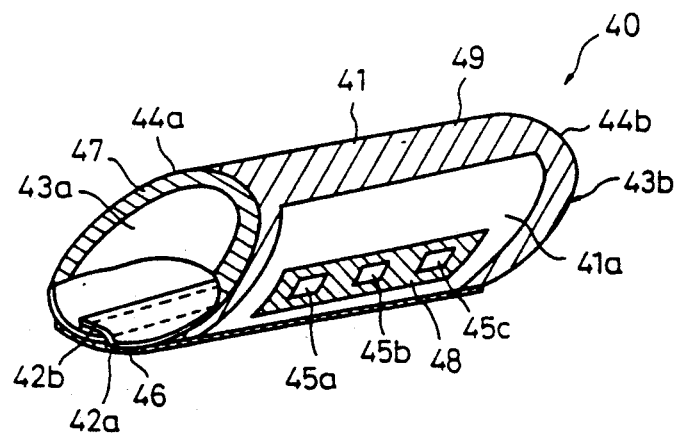
FIG. 17 is a perspective view illustrating an example of an air bag for a navigator's seat, in accordance with the present invention.
Figure 18A:
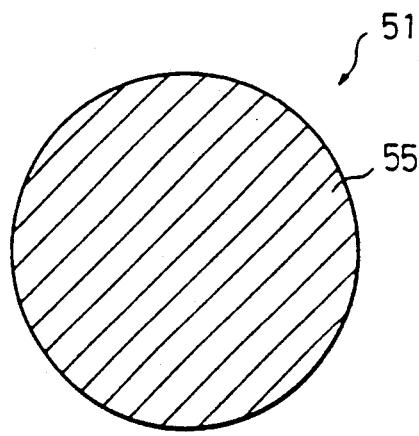
FIG. 18(A) is a plan view of a surface opposite the driver's seat and FIG. 18(B) is a plan view of a surface opposite the steering wheel.
Figure 18B:
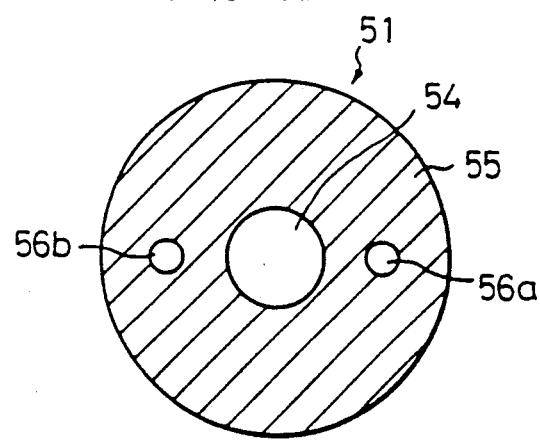

An example of an air bag used for the navigator's seat and the rear seat is shown in FIG. 17, as a perspective view. This air bag is formed by making a piece of the woven fabric 40 to a cylindrical shape, sewing both ends of the woven fabric 40 by sewing threads 42$a$ and 42$b$, closing both ends of a cylindrical woven fabric 41 by pieces of woven fabrics 43$a$ and 43$b$, and sewing together the cylindrical woven fabric 41 and the pieces 43$a$ and 43$b$ by sewing threads 44$a$ and 44$b$. A cylindrical face of the cylindrical woven fabric is provided with three inflater attaching holes 45$a$, 45$b$ and 45$c$, as shown in the drawing. In this air bag, a coating film of a chloroprene rubber is applied to portions 46, 47 and 48, added with inclined lines in the drawing, to reinforce the sewing portions and the inflater attaching hole, and to a portion 49 to adjust a volume of gas exhausted from the air bag. The whole surface of the woven fabric opposite the passenger, i e., a back side surface in the drawing, may be coated with the chloroprene rubber. In the drawing, 41$a$ denotes to a portion having an air permeability, i.e., the gas exhausting portion.

If a constitution of a woven fabric and an arrangement of a coating film in the air bag for the navigator's seat shown in FIG. 17 are determined in the same manner as those described in the explanation for an air bag for a driver's seat, an air bag having a required performance can be obtained. A joining treatment such as sewing a circumferential joining portion or the like can be omitted, and accordingly the manufacturing cost can be reduced and an increase of the strength of the joining portion can be attained.

Various experimental examples and comparative examples of air bag for a driver's seat, in accordance with the present invention, are now described hereafter.

Before the explanation of the experimental examples, the measuring methods used in evaluating the performances of the air bag will be described.

Strength of Woven Fabric

The strength is measured according to the JIS L-1096 6.12.1A method (Labeled Stripe Method)

Air Permeability of Woven Fabric Measured by Frazile Method

An air permeability is measured according to JIS L-1096 6.12.1A

Air permeability of Woven Fabric Measured in A Frazile Type and under a pressure of 0.5 kgf/cm$^2$.

Figure 15:
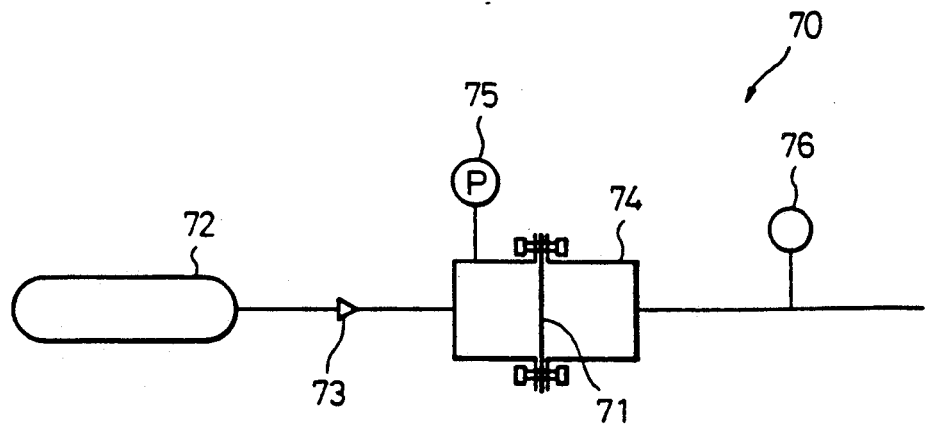
FIG. 15 is a view illustrating an apparatus for measuring an air permeability under a high pressure, i.e., 0.5 $kgf/cm^2$.
Figure 16:
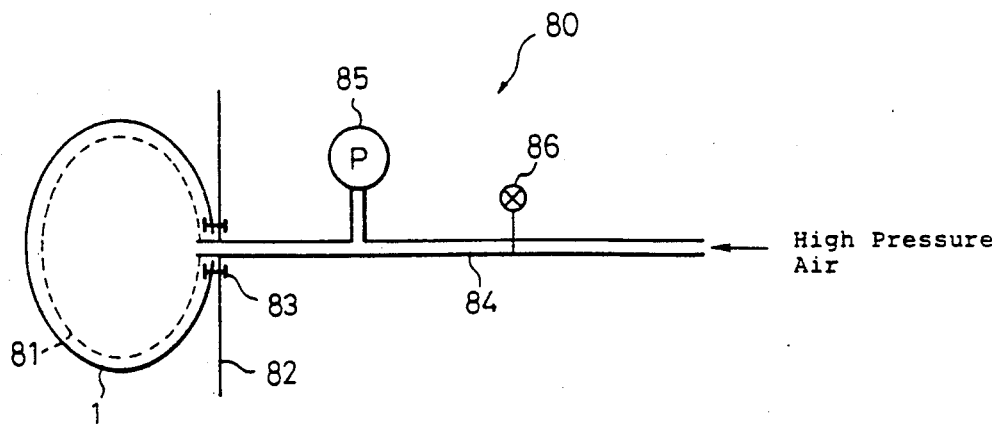
FIG. 16 is a view illustrating an apparatus for measuring a bursting strength of an air bag.

An air permeability of the woven fabric placed under a high pressure is measured by using a tester 70 having a structure shown in FIG. 15. As shown in FIG. 15, a test piece is fixed on a measuring case 71, and an area through which an air can be passed is determined to 21 cm$^2$ having a diameter of 5.2 cm. A pressure supplied from a compressor 72 is adjusted by a pressure regulator valve 73, and after a pressure applied to the test piece 71 is confirmed by a pressure gauge 75, a volume of air passing through the test piece under a constant pressure of 0.5 kgf/cm$^2$ is obtained by a flow meter 76.

Development Test of Air Bag

A value of $t_3$ shown in FIG. 14 is obtained by a device shown in FIG. 12, as described herebefore.

Bursting Test of Air Bag

A rubber balloon 81 having a larger volume than that of an air bag 1, upon inflating the balloon, is inserted into the air bag 1, and the air bag 1 and the rubber balloon 81 are fixed on a bag fitting plate 82 of a burst testing device, by a fixture 83. A volume of air supplied into the balloon 81 under a high pressure is adjusted by a pressure regulator valve, and the air bag 1 and the rubber balloon 81 are inflated together. A pressure when the air bag is burst is measured by a pressure gauge 85.

EXAMPLE GROUP 1

A woven fabric of a plain weave having a warp density of 30 per inch and a weft density of 30 per inch is woven from Nylon 66 multifilament of 840$^d$ having a strength of 9.5 g/d and an elongation of 20.5%, and a scouring treatment and heat set treatment are applied to the woven fabric. The characteristics of the set woven fabric are shown in Table 1.

Pieces having a size capable of being used as a woven fabric (A) opposite a passenger and a woven fabric (B) opposite a car body are cut from the woven fabric, and a coating film of a chloroprene rubber having the dimensions $w_1$, $d_0$, $d_1$, $d_2$ and $d_3$ expressed in Table 2 is coated on the woven fabric (A) and (B) by a screen. A weight of the coating film is 100 g/m$^2$. The coated fabrics are dried and vulcanized, and then an inflator attaching hole having the diameter $d_1$ is punched out in a central portion of the woven fabric (B). Three pieces having a doughnut shape with an inner diameter of 10 cm and an outer diameter of 20 cm, and made of the same woven fabric as that used for the air bag, are piled on each other and are sewn to an outer peripheral portion of the inflator attaching hole as a reinforcing fabric. Four bolt holes used for attaching an inflator are punched at equal intervals on the outer peripheral portion. Next, each circumferential portion of the woven fabrics (A) and (B) is sewn with two rows of a lock stitch having a stitch pitch of 2.8 mm and a seam interval of 3 mm by using a needle thread #5 and a bobbin thread #5, to make the air bag. The characteristics of the air bag are shown in Table 2. The gas can be exhausted during predetermined times by selecting a coating ratio as shown in Table 2.

When the coating ratio is lower (Example No. 4), an inflation characteristic having adequate values cannot be obtained.

EXPERIMENTAL GROUP 2

Plain weave woven fabrics having a different weight per unit area are woven by using Nylon 66 Multifilaments of 210$^3$, 420$^d$, 840$^d$, 1260$^d$ having the yarn characteristics shown in Table 3. The obtained woven fabric is scoured and applied with a heat set, and the characteristics of the set woven fabric are as shown in Table 1.

Coating films of the chloroprene rubber are coated on the woven fabric (A) opposite the passenger and the woven fabric (B) opposite the car body, in the same manner as in the Experimental group 1, and air bags are formed under the sewing condition shown in Table 4. A weight of the coating is 100 g/m$^2$ for the air bags using the multifilament having a denier of 840$^d$ or more and 70 g/m² for the air bags using the multifilament having a denier of 420$^d$ or less. The characteristics of the obtained air bag are shown in Table 2. When the woven fabric having the weight per unit area of between 100 g/m² and 300 g/m² is used to make the air bag, an air bag having a superior exhausting characteristic and a light weight can be obtained. When the woven fabric having the weight per unit area of 300 g/m² or more is used, the obtained air bag has superior exhausting characteristic, but a weight of the air bag is too heavy. Conversely, when the woven fabric having the weight per unit area of 100 g/m² or less is used, an air bag having a light weight can be obtained, but an inflation characteristic and a bursting strength of the obtained air bag are poor, and thus an air bag capable of protecting the passenger cannot be obtained.

EXPERIMENTAL GROUP 3

A woven fabric of a plain weave having a warp density of 28 per inch and a weft density of 28 per inch is formed by using Nylon 66 multifilament 1260$^d$, and after scouring treatment and heat set treatment are applied to the woven fabric, the obtained woven fabric is applied with a pressing treatment under the conditions of a linear pressure of 3 kg/cm and a circumferential speed of 5.0 m/min, by using a roll heated at 95° C. The characteristics of the obtained woven fabric are shown in Table 1. The air permeability values measured by a frazile method and measured by a frazile type tester under the pressure of 0.5 kgf/cm² are remarkably small, the value of $t_3$ becomes too long, and it is impossible to prevent a rebounding of the passenger.

EXPERIMENTAL GROUP 4

A woven fabric of a plain weave having a warp density of 52 per inch and a weft density of 52 per inch is formed by using Nylon 66 multifilament 420$^d$, and a scouring treatment and heat set treatment are applied to the woven fabric. The characteristics of the obtained woven fabric are shown in Table 1. An air bag is prepared according to the manufacturing method of Experimental Groups 1 and 2. When the air permeability measured by the frazile method is 2 cc/cm²/sec or less, an air bag having a superior inflation characteristic cannot be obtained.

EXPERIMENTAL GROUP 5

A woven fabric of a plain weave having a warp density of 25 per inch and a weft density of 24 per inch is formed by using Nylon 66 multifilament 840$^d$, and a woven fabric of a satin weave having a warp density of 60 per inch and a weft density of 60 per inch is formed by using Nylon 66 multifilament 420$^d$, and a scouring treatment and heat set treatment are applied to both woven fabrics. The characteristics of the obtained woven fabrics are shown in Table 1. A chloroprene rubber is coated on the surface of the woven fabrics according to the method of Experimental Group 1 to form gas exhausting portion on the woven fabric (A) opposite the passenger and the woven fabric (B) opposite the car body, and the air bag is manufactured under the sewing conditions shown in Table 4. The characteristics of the obtained air bag are shown in Table 2.

When the woven fabric having the cover factor of 1400 or less is used, the gas is exhausted in a short time, and thus a protection of the passenger can be achieved. Although an air bag satisfying a strength and an exhaustion characteristic can be usually obtained by making the value of the cover factor high, in a weave in which a density in the woven fabric is low, for example, in a satin weave, since an interlocking portion between the warp yarn and the weft yarn is loose, the gas exhausting volume becomes larger and the inflation characteristic becomes poor see Example No. 15).

EXPERIMENTAL GROUP 6

A woven fabric of a plain weave having a warp density of 28 per inch density of 28 per inch is formed by using Nylon 66 multifilament 840$^d$, and a scouring treatment and heat set treatment are applied to the woven fabric. The characteristics of the obtained woven fabrics are shown in Table 1. A chloroprene rubber is coated on the whole surface of the woven fabric (A) opposite the passenger such that an exhausting portion is not made on the woven fabric (A) and is partially coated on the woven fabric (B) opposite the car body such that an exhausting portion is made. Then an air bag is formed according to a method in Experimental Group 1. The inflation characteristic of the obtained air bag is superior.

EXPERIMENTAL GROUP 7

A double woven fabric having the same fabric constitution as that in Example No. 16, is formed by joining a circumferential portion thereof by an interlocking one layer weave as shown in FIG. 10, by using a weaving loom equipped with a jacquard device, and a scouring treatment and heat treatment are applied to the woven fabric. The characteristics of this woven fabric are the same as those in Example No. 16.

A coating treatment and a bag formation are performed according to Example No. 16. An inflation characteristic of the obtained air bag is superior compared with the air bag manufactured by sewing.

EXPERIMENTAL GROUP 8

A double woven fabric having the same fabric constitution as that in Example No. 7 is formed by joining a circumferential portion thereof by an interlocking one layer weave as shown in FIG. 10 by using the weaving loom equipped with a jacquard device, and a scouring treatment and heat set treatment are applied to the woven fabric. The characteristics of this woven fabric are the same as those in Example No. 7. A coating treatment and a bag formation are performed according to Example No. 2.

- An inflation characteristic of the obtained air is superior compared with the air bag manufactured by sewing.

EXPERIMENTAL GROUP 9

The woven fabric obtained in Example No. 13 is coated over the whole surface thereof and an air bag with exhausting holes as shown in FIG. 13 is formed. Two exhausting holes having a diameter of 3 cm$\phi$ are provided, and the other specifications such as finishing, sewing or the like are adopted according to the specification in Example 13. An inflation characteristic of the obtained air bag is superior, but the weight of this air bag is relatively heavy compared with that of Example No. 13.

EXPERIMENTAL GROUP 10

Examples of air bags which have no coating film or a circumferential joining portion and a position near thereto are described in Experimental Group 10.

In Example No. 20, a woven fabric having the same fabric constitution as that in Example No. 7 in Experimental Group 2 is used, and circumferential joining portions are joined by sewing. The air bag is formed by coating by a pattern in which a circumferential joining portion and a portion near thereto are omitted from the pattern used in Example No. 7. Namely, the air bag in which the value of $W_1$ is zero is prepared and tested.

As a result of the test, it is confirmed that an inflation characteristic of this air bag is superior and has the same level as that in Example No. 7.

Nevertheless, the bursting strength of this air bag is poor compared with the air bag having the circumferential joining portion thereof coated i.e., the air bag in Example 7, but when an inflator having a low pressure gas generated therein is used, the value of the bursting strength of this air bag is practically useful.

In Example No. 21, an air bag has the same constitution as that of Example No. 18 in Experimental Group 8, except that a coating for a circumferential joining portion is omitted, i.e., the air bag in which the value of W is zero, is manufactured and is tested.

As a result of the test, it is confirmed that an inflation characteristic of this air bag is superior and has substantially the same level as that in Example No. 18.

Further, a bursting strength of this air bag is substantially the same as that of the air bag having the circumferential joining portion thereof coated, i.e., the air bag in Example No. 18.

TABLE 1

| Experimental Group No. | Example No. | Constitution of Woven Fabric | | | | Strength of Woven Fabric Warp × Weft (number per inch) | Weight per Unit Area (g/m$^2$) | Cover Factor | Air Permeability by Frazile Method (cc/cm$^2$/sec) | Air Permeability Under Pressure of 0.5 kgf/cm$^2$ (cc/cm$^2$/sec) |
|---|---|---|---|---|---|---|---|---|---|---|
| | | Yarn (denier) | Weave | Density Warp × Weft (number per inch) | | | | | | |
| 1 | 1–4 | 840 | Plain | 30 × 30 | | 225 × 220 | 242 | 1739 | 9 | 261 |
| 2 | 5 | 1260 | Plain | 27 × 27 | | 307 × 304 | 295 | 1917 | 6 | 260 |
| | 6 | 840 | Plain | 28 × 28 | | 210 × 208 | 215 | 1623 | 8 | 305 |
| | 7 | 420 | Plain | 42 × 42 | | 129 × 125 | 169 | 1721 | 10 | 460 |
| | 8 | 210 | Plain | 60 × 60 | | 90 × 89 | 110 | 1739 | 12 | 571 |
| | 9 | 1260 | Plain | 28 × 28 | | 320 × 314 | 308 | 1988 | 4 | 226 |
| | 10 | 210 | Plain | 53 × 53 | | 80 × 78 | 97 | 1536 | 23 | 700 or more |
| 3 | 11 | 1260 | Plain | 28 × 28 | | 320 × 314 | 305 | 1988 | 0 | 96 |
| 4 | 12 | 420 | Plain | 52 × 52 | | 155 × 153 | 211 | 2131 | 1.5 | 203 |
| 5 | 13 | 840 | Plain | 25 × 25 | | 183 × 180 | 203 | 1449 | 15 | 416 |
| | 14 | 840 | Plain | 24 × 24 | | 176 × 174 | 191 | 1391 | 22 | 608 |
| | 15 | 420 | Basket | 60 × 60 | | 180 × 176 | 238 | 2459 | 11 | 583 |
| 6 | 16 | 840 | Plain weave | 28 × 28 | | 210 × 208 | 215 | 1623 | 8 | 305 |
| 7 | 17 | Tubular Woven Fabric having a constitution of Example 16 | | | | | | | | |
| 8 | 18 | Tubular Woven Fabric having a constitution of Example 7 | | | | | | | | |
| 9 | 19 | Woven Fabric of Example 13 is used. | | | | | | | | |
| 10 | 20 | Woven Fabric of Example 7 is used. | | | | | | | | |
| | 21 | Tubular Woven Fabric having a constitution of Example 18. | | | | | | | | |

TABLE 2

| Experimental Group No. | Example No. | Pattern of Coating (cm) | | | | | Ratio of Coating | Characteristics of Inflation | | Weight of Bag (g) | Bursing Strength (kgf/cm$^2$) | |
|---|---|---|---|---|---|---|---|---|---|---|---|---|
| | | $W_1$ | $d_0$ | $d_1$ | $d_2$ | $d_3$ | | $P_2$ (kgf/cm$^2$) | $t_3$ (ms) | | | |
| 1 | 1 | 2.5 | 70 | 10 | 50 | 50 | 65 | 0.18 | 190 | 293 | 2.5 | Present Invention |
| | 2 | 2.5 | 70 | 10 | 60 | 55 | 79 | 0.20 | 122 | 304 | 2.5 | Present Invention |
| | 3 | 2.5 | 70 | 10 | 62 | 62 | 90 | 0.24 | 151 | 314 | 2.5 | Present Invention |
| | 4 | 2.5 | 70 | 10 | 50 | 30 | 48 | 0.14 | 67 | 278 | 2.5 | Comparative Example |
| 2 | 5 | 2.5 | 70 | 10 | 60 | 50 | 76 | 0.25 | 148 | 354 | 2.8 | Present Invention |
| | 6 | 2.5 | 70 | 10 | 60 | 50 | 76 | 0.22 | 113 | 277 | 2.3 | Present Invention |
| | 7 | 2.5 | 70 | 10 | 60 | 50 | 76 | 0.21 | 120 | 211 | 1.8 | Present Invention |
| | 8 | 2.5 | 70 | 10 | 60 | 50 | 76 | 0.18 | 94 | 156 | 1.3 | Present Invention |
| | 9 | 2.5 | 70 | 10 | 60 | 50 | 76 | 0.25 | 176 | 365 | 2.8 | Comparative Example |
| | 10 | 2.5 | 70 | 10 | 60 | 50 | 76 | 0.12 | 52 | 143 | 1.1 | Comparative Example |
| 3 | 11 | 2.5 | 70 | 10 | 60 | 50 | 76 | 0.25 | 207 | 362 | 2.7 | Comparative Example |
| 4 | 12 | 2.5 | 70 | 10 | 60 | 50 | 76 | 0.24 | 183 | 251 | 1.6 | Comparative Example |
| 5 | 13 | 2.5 | 70 | 10 | 60 | 50 | 76 | 0.19 | 98 | 266 | 2.1 | Present Invention |
| | 14 | 2.5 | 70 | 10 | 60 | 50 | 76 | 0.17 | 67 | 255 | 2.0 | Comparative Example |
| | 15 | 2.5 | 70 | 10 | 60 | 50 | 76 | 0.15 | 68 | 277 | 2.2 | Comparative Example |
| 6 | 16 | 2.5 | 70 | 10 | 65 | 50 | 82 | 0.19 | 116 | 282 | 2.3 | Present Invention |
| 7 | 17 | 2.5 | 70 | 10 | 65 | 50 | 82 | 0.22 | 139 | 273 | 2.2 | Present Invention |
| 8 | 18 | 2.5 | 70 | 10 | 60 | 50 | 76 | 0.23 | 141 | 202 | 1.7 | Present Invention |
| 9 | 19 | Whole surface is coated. | | | | | 100 | 0.20 | 108 | 311 | 2.1 | Comparative Example |
| 10 | 20 | 0 | 70 | 10 | 60 | 50 | 62 | 0.20 | 110 | 175 | 1.4 | Present Invention |
| | 21 | 0 | 70 | 10 | 60 | 50 | 62 | 0.20 | 115 | 165 | 1.8 | Present Invention |

TABLE 3

| Properties of Yarn Used | | |
|---|---|---|
| | Strength (g/d) | Elongation (%) |
| 1260d | 9.5 | 20.5 |
| 840d | 9.5 | 20.5 |
| 420d | 7.5 | 18.0 |
| 210d | 7.5 | 18.5 |

TABLE 4

| Sewing Conditions | | | |
|---|---|---|---|
| Sewing thread | | Type of Seam: Lock Stitch | |
| needle thread | bobbin thread | Stitch Pitch (mm) | Interval between Seams |
| 1260d | #5 | #5 | 2.8 | 3 |

TABLE 4-continued

| Sewing Conditions | | | |
|---|---|---|---|
| Sewing thread | | Type of Seam: Lock Stitch | |
| needle thread | bobbin thread | Stitch Pitch (mm) | Interval between Seams |
| 840d | #5 | #5 | |
| 420d | #5 | #5 | |
| 210d | #8 | #8 | |

CAPABILITY OF EXPLOITATION IN INDUSTRY

In an air bag in accordance with the present invention, a woven fabric having a weight per unit area which provides it with a strength required for an air bag is used, a coating film is provided at least on a outer peripheral area of a gas generator attaching hole and an area in contact with a passenger, and an area of a portion having no coating film, and which is used as an exhausting portion, is determined such a manner that gas in the air bag is exhausted after the air bag is inflated under a required relationship between a pressure and a time.

Accordingly, the air bag in accordance with the present invention does not require an arrangement of an exhausting hole, as in a conventional known air bag, and can minimize an increase of a weight caused by a use of the coating. As a result, a high quality air bag preventing a rebounding phenomenon and having light, soft and a good accommodating properties can be obtained. Further, the manufacturing man-hours can be reduced, and a consumption of material, such as a coating material the like can also be reduced and accordingly it is possible to manufacture the air bag at a lower price.

The air bag obtained in accordance with the present invention can be used as an air bag for a driver's seat, a navigator's seat and a rear seat, due to the superior performance thereof.

We claim:

1. An air bag for mounting in a vehicle having, when inflated, a first portion for opposing the vehicle and a second portion for opposing an occupant, the air bag comprising:
    at least two pieces of gas permeable fabric, each having a circumferential edge, joined to one another at a continuous seam radially inward from the circumferential edge, forming an air bag having an interior and an exterior surface;
    one of the at least two pieces of gas permeable fabric constituting the first portion having an opening therein defined by an internal perimeter edge;
    another of the at least two pieces of gas permeable fabric constituting the second portion;
    a gas impermeable coating disposed on at least a fraction of the second portion forming a continuous impermeable area for engaging, when inflated, an occupant's torso and head;
    a gas generator connected to the first portion adjacent the internal perimeter edge of the opening for inflating the air bag to a predetermined pressure upon impact of the vehicle with another object; and
    the at least two pieces of gas permeable fabric having a total gas permeable uncoated area selected as a function of warp and weft density of the gas permeable fabric for uniformly exhausting gas to approximately zero pressure in the air bag in the range from approximately 70 milliseconds to 170 miliseconds from commencement of inflation of the air bag and in response to the predetermined pressure of the gas during inflation of the air bag and external pressure of the occupant against the second portion of the air bag.

2. The air bag according to claim 1, wherein the coated portion includes a circumferential strip on the first and second portions covering the continuous seam.

3. The air bag according to claim 2, wherein the circumferential strip covers the continuous seam on the interior surface of the air bag.

4. The air bag according to claim 2, wherein the circumferential strip covers the continuous seam on the exterior surface of the air bag.

5. The air bag according to claim 2, wherein the circumferential strip covers the continuous steam on both the interior surface and exterior surface of the air bag.

6. The air bag according to claim 1, wherein the continuous seam is an interlocking one layer weave.

7. The air bag according to claim 6, wherein the one layer interlocking weave is composed of sewn thread.

8. The air bag according to claim 2, further comprising a reinforcing stitch between the continuous seam and the circumferential edge for attaching the circumferential edge to one of the at least two pieces of gas permeable fabric.

9. The air bag according to claim 8, wherein the circumferential strip covers both the continuous seam and the reinforcing stitch.

10. The air bag according to claim 1, wherein the at least two pieces of gas permeable fabric are substantially circular in shape.

11. The air bag according to claim 1, further comprising:
    at least one reinforcing fabric ring attached to the first portion around the opening defined by the internal perimeter edge;
    at least one attachment stitch for attaching the at least one reinforcing fabric ring to the first portion; and
    wherein the coating portion includes an annular area adjacent the opening defined by the internal perimeter edge.

12. An air bag according to claim 1, wherein the function of warp and weft density is characterized by an equation to determine the cover factor, I, where $K=K_T+K_W$, wherein $K_T=$warp density (ends/inch) $\times$ thickness of warp yarn (denier) and $K_W=$weft density (pitches/inch) $\times$ thickness of weft yarn (denier).

13. An air bag according to claim 1, wherein the gas permeable fabric has weight per unit area between 100 $gm^2$ and 300 $g/m^2$.

14. The air bag according to claim 1 having a substantially circular shape when inflated.

15. The air bag according to claim 1 having a substantially cylindrical shape when inflated.

16. The air bag according to claim 1, wherein the warp and weft density of the gas permeable fabric allow deflation at a rate in a range from approximately 100 $cc/cm^2/sec$ to 600 $cc/cm^2/sec$ when the predetermined pressure of the air bag is 0.5 $kgf/cm^2$.

17. The air bag according to claim 1, wherein the warp and weft density of the gas permeable fabric allows deflation at a rate in a arrange from approximately .2 $cc/cm^2/sec$ to 20 $cc/cm^2/sec$ as measured by a frazile type tester.

18. The air bag according to claim 13, wherein the cover factor, K, is in a range from approximately 1400 to approximately 2400.

19. The air bag according to claim 12, wherein the gas permeable fabric has a warp and weft density similar to nylon 66 multifilament.

20. The air bag according to claim 1, wherein the gas impermeable coating corresponds to the physical properties of chloroprene rubber.

21. The air bag according to claim 11, wherein two reinforcing fabric rings are attached to the first portion adjacent the opening defined by the internal perimeter edge.

22. The air bag according to claim 11, wherein two attachment stitches attach the at least one reinforcing fabric ring to the first portion.

23. An air bag for mounting in a vehicle having, when inflated, a first portion for opposing the vehicle and a second portion for opposing an occupant, the air bag comprising:

at least two pieces of gas permeable fabric, each having a circumferential edge, joined to one another at a continuous region radially inward from the circumferential edge, forming an air bag having an interior and an exterior surface;

one of the at least two pieces of gas permeable fabric constituting the first portion having an opening therein defined by an internal perimeter edge;

another of the at least two pieces of gas permeable fabric constituting the second portion;

a gas impermeable coating disposed on at least a fraction of the second portion forming a continuous impermeable area for engaging, when inflated, an occupant's torso and head;

a gas generator connected to the first portion adjacent the internal perimeter edge of the opening for inflating the air bag to a predetermined pressure upon impact of the vehicle with another object;

a reinforcing stitch at the continuous seam adjacent circumferential edge for attaching the circumferential edge to at least one of the two pieces of gas permeable fabric; and the at least two pieces of gas permeable fabric having a total gas permeable uncoated area selected as a function of warp and weft density of the gas permeable fabric for uniformly exhausting gas to approximately zero pressure in the air bag in the range from approximately 70 milliseconds to 170 milliseconds from commencement of inflation of the air bag and in response to the predetermined pressure of the gas during inflation of the air bag and external pressure of the occupant against the second portion of the air bag.

* * * * *

UNITED STATES PATENT AND TRADEMARK OFFICE
CERTIFICATE OF CORRECTION

PATENT NO. : 5,114,180
DATED : May 19, 1992
INVENTOR(S) : Yoshinori Kami et al.

It is certified that error appears in the above-identified patent and that said Letters Patent is hereby corrected as shown below:

Claim 1, column 19, line 68 to column 20, line 1, change "miliseconds" to --milliseconds--.

Claim 17, column 20, line 66, change "arrange" to --range--.

Claim 18, column 21, line 1, change "claim 13" to --claim 12--.

Signed and Sealed this

Fifth Day of October, 1993

BRUCE LEHMAN

*Attest:*

*Attesting Officer*           Commissioner of Patents and Trademarks